UNITED STATES PATENT OFFICE.

FOORD VON BICHOWSKY AND JOHN F. HARTHAN, OF POMONA, CALIFORNIA.

PROCESS FOR THE SYNTHETIC PRODUCTION OF TITANIUM-NITROGEN COMPOUNDS.

1,391,148.　　　　　Specification of Letters Patent.　　Patented Sept. 20, 1921.

No Drawing.　　　Application filed June 1, 1920.　Serial No. 385,562.

*To all whom it may concern:*

Be it known that we, FOORD VON BICHOWSKY and JOHN F. HARTHAN, both citizens of the United States, residing at Pomona, in the county of Los Angeles and State of California, have invented a new and useful Process for the Synthetic Production of Titanium-Nitrogen Compounds, of which the following is a specification.

This invention relates to the synthetic production of titanium-nitrogen compounds (under which term we include the nitrid $Ti_2N_2$, and the, so-called cyanonitrid $Ti(CN)_2$, $Ti_3N_2$ of titanium, or a mixture of these compounds) by the reaction of nitrogen and hydrocarbon gases or vapors in the presence of a catalytic agent. It is known that nitrogen gas will combine with suitable compounds of titanium at a lower temperature and more rapidly when the reaction takes place in the presence of an alkali metal salt than if such salt is not present. We have discovered that if the catalytic agent contains a metal of the iron group, as well as the alkali metal salt, the reaction can be effected more expeditiously at a still lower temperature. We have also discovered that by employing a hydrocarbon gas or vapor with the nitrogen the catalytic reactive mass employed may be prepared free of carbon. It is to be understood that the term hydrocarbon gas employed in this specification has a generic meaning and that it defines all forms of natural gas, whether marsh or petroleum or any natural gases of the paraffin series which are, as is well known, simply impure forms of methane. The term hydrocarbon gas also defines any artificially prepared gas containing appreciable quantities of methane or its homogeners.

In general, this process consists in preparing the reacting gas by mixing together nitrogen and natural gas, or the gaseous vapor of suitable hydrocarbons, then passing the mixture of gases through the catalytic reactive mass at suitable temperatures for securing the desired reaction, and finally recovering from the catalytic reactive mass the titanium-nitrogen compounds.

The hydrocarbon employed may be any simple, easily volatilized hydrocarbon free from combined nitrogen such, for example, as benzol $C_6H_6$; or a mixture of non-aromatic hydrocarbons such, for example, as gasolene or kerosene; or even the finely atomized particles of crude oil or melted naphthalene $C_{10}H_8$. In practice we use atmospheric nitrogen, by simply mixing air with impure methane or natural gas and then pass the mixture of gases over iron heated to a temperature of about 700° C. and we remove the resulting carbon dioxid in any suitable manner, for example, by absorption in water under pressure, or by passing through lime towers or by both of these operations. This preliminary mixture of air and gas tends to decompose and thus remove any sulfur compounds which the gas might contain and the presence of which would be injurious to the catalytic mass as will be made clear hereinafter. This preliminary mixture of air and natural gas must be maintained at approximately the temperature stated, otherwise an excess of carbon might be split off and lost during the heating. The flow of mixed gas and air should be so regulated and the number of treatments so arranged that all of the oxygen in the air is removed in a combined form. The proportion of nitrogen used with the methane may vary, but in practice we at present find a mixture of two parts by volume of natural gas to one of air to be best, since in a mixture of such proportions the necessary amount of carbon is given off when the mixture is decomposed by the reactive mass at the comparatively high temperature employed.

The catalytic reactive mass discovered by us to best suit the purpose comprises a mixture containing a suitable alkali or alkali metal salt, a suitable titanium compound, and a metal of the, so-called, iron group. The alkali may be, for example, the oxid or carbonate of sodium or the oxid or carbonate of potassium. The titanium compound may be any of the natural or artificially prepared oxids or mixed oxids. We prefer, however, to use the dioxid $TiO_2$ or its naturally occurring, common form, the mineral known as rutile. The metal may be iron, nickel, or cobalt, or mixtures of any two of the same or all; and the metal may be either in the metallic form or in combination such as the oxids or carbonates.

When the reactive mass contains only the titanium compound, such as the dioxid, we find that the mass must be heated to a temperature of about 1500° C. before the nitrogen in the mixture of gases will react. We also find that even when an alkali metal salt is added the reaction does not begin until a temperature of about 1100° C. is reached. However, upon the addition of a metal or metals of the iron group the temperature at which the reaction takes place is materially lower, a rapid absorption and combination of the nitrogen and the titanium oxid taking place at a temperature of about 1000° C. In view of this the process assumes commercial value and is, technically, much easier to perform than when a metal of the iron group is not used. It makes but slight difference whether the metal be originally present in the metallic state or in some form of chemical combination.

We prefer to employ for the alkali metal salt a comparatively cheap carbonate such, for example, as sodium carbonate. If sulfates or sulfids were used they would by themselves or through reduction with carbon liberate sulfur which would react with the iron and thus lower the activity of the iron as a catalyzer. Sodium titanate or sodium ferrates are also useful salts in the process as they liberate some sodium, either as the metal or the carbonate, upon reduction at the temperatures employed in this process. In all of the reactions the presence of carbon, as such, in the catalyzer is not essential to the process, for the reason, hereinbefore mentioned, that the methane or other hydrocarbon employed is itself a source of supply of carbon for maintaining a reducing medium or for supplying carbon to the cyanonitrid or for both of these. In preparing the catalytic mass the introduction thereto of carbon compounds may be a benefit for an entirely different reason, namely that such carbon compounds upon heating decompose and thus liberate gases and steam which function to render the catalytic reactive mass more porous so that it presents throughout a much greater surface of contact for the gas. This action of the carbon in its compounds would not be, however, a primary one.

The temperature under which the reaction takes place may vary considerably within certain limitations. In this class of synthetic processes the temperatures required are comparatively high and, without meaning to limit the invention thereto, it may be stated that we have discovered that a minimum temperature of about 900° C. is required to bring about the reaction, the percentage of combined nitrogen appearing to rise with the temperature. There is naturally a maximum temperature and such, in practice, is just below the melting point of whatever metal is employed as the catalyzer, otherwise the molten metal would flow together and collect in the slightly cooler parts of the reaction mass, thus stopping the passage of the gas through said mass. It may be here noted that the melting point of the metal used will be somewhat lowered because of its absorption of carbon from the decomposed gases.

After the reaction is completed the nitrids will be recovered from the catalytic reactive mass. We have discovered that this can be done by grinding and separating the somewhat lighter nitrogen compounds and undecomposed rutile from the heavier iron, and other metallic particles, either by magnetic attraction, by mechanical classification, by flotation or by a combination of any two or more of these operations.

The nitrid or cyanonitrid or mixtures thereof thus obtained will then be decomposed by superheated steam at a temperature of about 600° C., to liberate hydrocyanic acid and ammonia which are then absorbed by the use of suitable reagents. If the metal were not first removed from the catalyzer, as above described, it would catalytically decompose the hydrocyanic acid and ammonia, at the temperature employed, almost as fast as said acid and ammonia would form.

In order to make clear the process as we have actually used it a concrete example is given, as follows: The catalyzer is first prepared by making a mixture of finely ground material in proportions by weight as follows:

Titanium dioxid (rutile 95% pure) _____ 40 parts.
Sodium carbonate anhydrous ____ 10 parts.
Metallic iron _____ 50 parts.

This mixture is then moistened with water containing a small amount of a suitable binder such, for example, as glucose or molasses. Then the mass is formed into small cylindrical briquets and the briquets are roasted to free them from water. The briquets are then placed in upright or inclined retorts and heated to a temperature of about 900° C. or higher, air being excluded by passing natural gas free from oxygen through the retorts while the briquets are being heated. When a temperature of about 900° C. is reached a mixture of pure nitrogen, obtained from air, and natural gas, as hereinbefore described, is admitted under slight pressure to the retorts or, if preferred, pure nitrogen carbureted by mixing with a suitable hydrocarbon such, for example, as crude oil distillate will be admitted to the retorts. The hydrogen, which is liberated by cracking or splitting up of the methane, also has a strong reducing action and thus helps to prevent traces of oxygen, that might leak into the retorts, from acting upon the hot nitrids. In order to obtain the best results the iron must be finely divided and for that reason we prefer to use the iron in the form of very fine filings.

The titanium dioxid formed by the decomposition of the nitrid or cyanonitrid with steam, as represented by the equation—

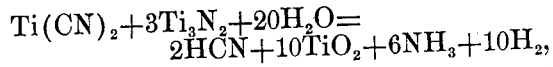
$$Ti(CN)_2 + 3Ti_3N_2 + 20H_2O = 2HCN + 10TiO_2 + 6NH_3 + 10H_2,$$

and the metal recovered, as hereinbefore described, are mixed with the proper proportion of sodium carbonate and then worked into a fresh catalytic reactive mass in the form of briquets.

We claim:

1. The process for the synthetic production of titanium-nitrogen compounds, which consists in passing a mixture of nitrogen and hydrocarbon gases or vapors through a heated catalytic reactive mass containing an oxygen-containing titanium compound, and then recovering the resulting titanium-nitrogen compound.

2. The process for the synthetic production of titanium-nitrogen compounds, which consists in passing a mixture of nitrogen and hydrocarbon gases or vapors through a heated catalytic reactive mass containing an oxygen-containing titanium compound, an alkaline substance and a metal of the iron group, and then recovering the resulting titanium-nitrogen compound.

3. The process for the synthetic production of titanium-nitrogen compounds, which consists in passing a mixture of nitrogen and hydrocarbon gases or vapors through a heated catalytic reactive mass devoid of carbon and containing an oxygen-containing titanium compound, and then recovering the resulting titanium-nitrogen compound.

4. The process for the synthetic production of titanium-nitrogen compounds which consists in passing a mixture of nitrogen and hydrocarbon gases or vapors through a heated catalytic reactive mass devoid of carbon and containing an oxygen-containing titanium compound, an alkaline substance and a metal of the iron group, and then recovering the resulting titanium-nitrogen compound.

5. The process for the synthetic production of titanium-nitrogen compounds, which consists in passing a mixture of nitrogen and hydrocarbon gases or vapors through a catalytic reactive mass heated to a temperature of approximately 1000° C. and containing an oxygen-containing titanium compound, and then recovering the resulting titanium-nitrogen compound.

6. The process for the synthetic production of titanium-nitrogen compounds, which consists in passing a mixture of nitrogen and hydrocarbon gases or vapors through a catalytic reactive mass heated to a temperature of approximately 1000° C. and containing an oxygen-containing compound, an alkaline substance and a metal of the iron group, and then recovering the resulting titanium-nitrogen compound.

7. In the process for the synthetic production of titanium-nitrogen compounds by catalysis, that step which consists in subjecting a mixture of nitrogen and hydrocarbon gases or vapors under a temperature of approximately 1000° C. to the action of a catalytic reactive mass, substantially devoid of carbon and comprising an oxygen-containing titanium compound capable of reacting with the nitrogen to produce a titanium-nitrogen compound.

8. The process for the synthetic production of titanium-nitrogen compounds, which consists in heating an oxygen-containing titanium compound in the presence of nitrogen and a hydrocarbon gas or vapor, and then recovering the resulting titanium-notrogen compound.

9. The process for the synthetic production of titanium-nitrogen compounds, which consists in heating an oxygen-containing titanium compound, carbon, an alkali metal salt, and a metal of the iron group in the presence of nitrogen and a hydrocarbon gas or vapor, and then recovering the resulting titanium-nitrogen compound.

Signed at Los Angeles, California this 24 day of May 1920.

FOORD von BICHOWSKY.
JOHN F. HARTHAN.

Witnesses:
GEORGE H. HILES,
L. BELLE WEAVER.